Figures 1, 2, 3:
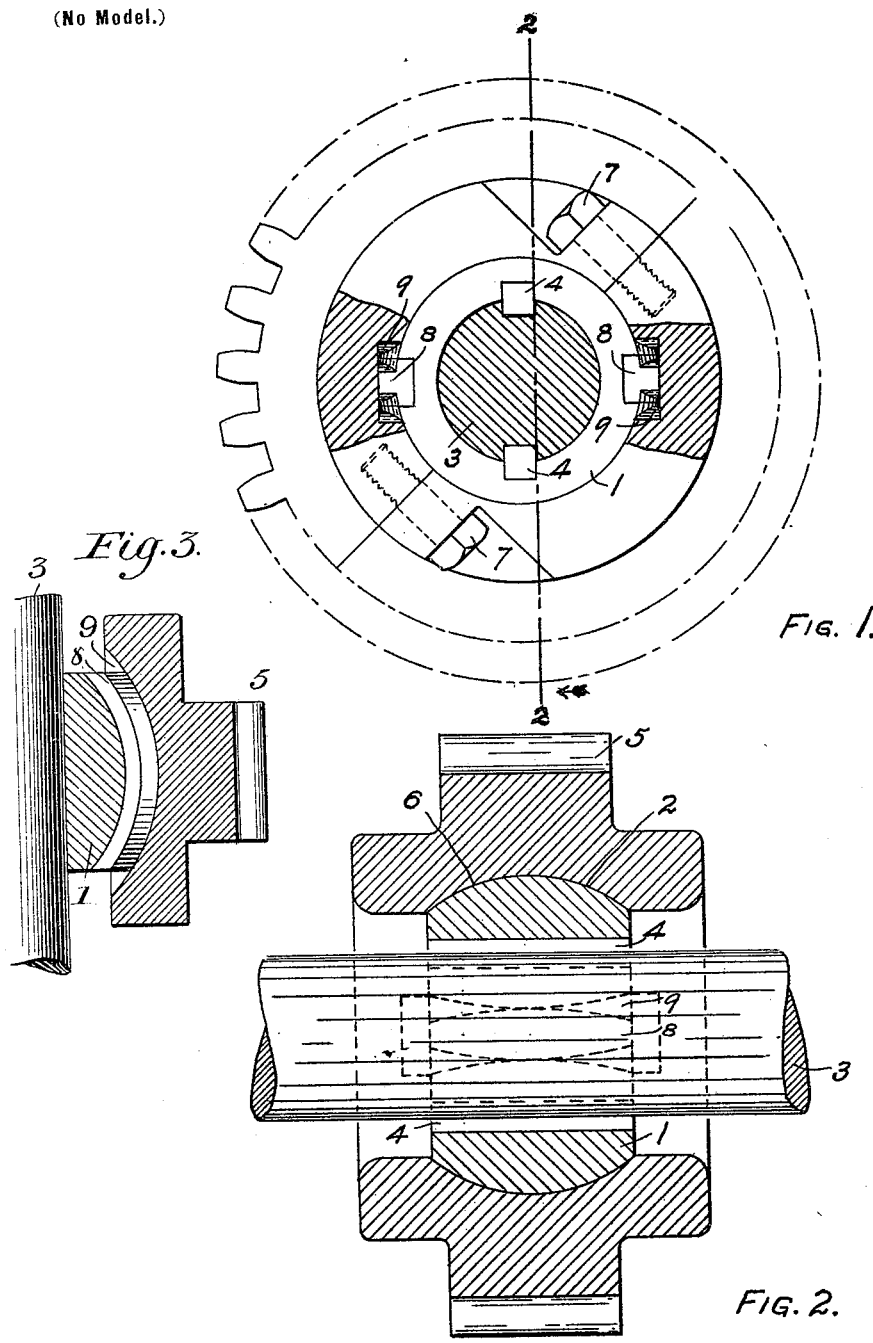

No. 641,940. Patented Jan. 23, 1900.
F. I. DANA.
GEARING.
(Application filed Oct. 4, 1897.)
(No Model.)

WITNESSES,
R. A. Bates
Ira L. Fish

INVENTOR,
Frederick I. Dana
BY Wilmarth H. Thurston
ATT'Y

UNITED STATES PATENT OFFICE.

FREDERICK I. DANA, OF PROVIDENCE, RHODE ISLAND, ASSIGNOR TO THE THOMAS PHILLIPS COMPANY, OF SAME PLACE.

GEARING.

SPECIFICATION forming part of Letters Patent No. 641,940, dated January 23, 1900.

Application filed October 4, 1897. Serial No. 653,953. (No model.)

*To all whom it may concern:*

Be it known that I, FREDERICK I. DANA, of Providence, county of Providence, State of Rhode Island, have invented certain new and useful Improvements in Gearing; and I do hereby declare the following specification, taken in connection with the accompanying drawings, forming a part of the same, to be a full, clear, and exact description thereof.

The invention relates to means for so mounting a rotary member, such as a gear or pulley, upon a support that said gear or pulley may rotate with said support, and thus drive or be driven from said support, although the axis of rotation of the gear or pulley does not coincide with the axis of the support upon which said pulley or gear is mounted; and said invention consists in providing the support and rotary member with engaging spherical surfaces which may slide upon each other as the parts revolve and positively connecting said support and rotary member. By thus connecting the support and the gear or pulley one will be positively driven by the other and the angle between their axes of rotation may be adjusted as desired, or the said angle may be constantly varied while said parts are in motion. The support may, if desired, be secured to or formed upon a shaft, in which case said shaft will drive said gear or pulley or be driven thereby, or said support may be loosely mounted upon a shaft, in which case said shaft will serve merely as a pivot about which the gear or pulley and the support will revolve.

The invention may be applied to spur, bevel, or other forms of gearing or to any form of pulley, and in the accompanying drawings it is shown in its preferred form in connection with the spur-gear.

Referring to the drawings, Figure 1 is an end elevation showing a spur-gear connected to a shaft by means embodying one feature of the invention in its preferred form. Fig. 2 is a sectional view of the same. Fig. 3 is a partial horizontal section through the axis of the shaft in Fig. 1.

Referring to Fig. 1, a support in the form of a sleeve or collar 1 is provided with a spherical surface 2, the center of which lies in the axis of the shaft 3, to which the said collar is secured by means of the keys 4; or, if desired, said support may be formed integral with said shaft. A spur-gear 5 is provided with a spherical surface 6, which fits upon the spherical surface 2, said gear being formed in two parts held together by means of bolts 7. The support and gear are positively connected together by means of keys 8, secured to the support, which engage keyways 9, formed in the gear, and the sides of said keys and keyways are curved, as shown, to allow a relative rocking movement between the gear and support as they revolve, whereby one will be positively driven by the other, while allowing the angle between their axes to be adjusted or constantly changed. While the devices for connecting the support and gear above described are preferred when using the invention either in connection with gearing or pulleys, it will be understood that the key may be secured to either part and that either the sides of the keyway or the sides of the key may be curved, or both may be curved, as shown. It will also be understood that the number of positive connections may be varied.

If it is not desired that the shaft revolve with the support, said support may be loosely mounted on said shaft.

What I claim as my invention, and desire to secure by Letters Patent, is—

1. The combination of a support for a rotary member provided with a spherical surface, a rotary member provided with an engaging spherical surface, a key projecting from and rigidly connected with one of said surfaces and having a curved outer surface concentric with said spherical surfaces, and a keyway in the other surface having a curved bottom concentric with said spherical surfaces, the sides of one of said parts being curved whereby said parts may rock on each other, substantially as described.

2. The combination of a sleeve or collar provided with a spherical surface, a rotary member provided with an engaging spherical surface, a key projecting from one of said surfaces and rigidly connected therewith, said key having a curved outer surface concentric with said spherical surfaces and having curved sides, a keyway in the other surface having a curved bottom concentric with said spherical surface and having curved sides engaging the sides of said key, substantially as described.

FREDERICK I. DANA.

Witnesses:
R. A. BATES,
IRA L. FISH.